Sept. 30, 1947. L. LIVADAS 2,428,233
DISPENSER WITH TRAP CHAMBER OPERATED BY TILTING THE CONTAINER
Filed April 27, 1944

INVENTOR.
Louis Livadas.
BY Corbett, Mahoney & Miller
ATTORNEYS

Patented Sept. 30, 1947

2,428,233

UNITED STATES PATENT OFFICE 2,428,233

DISPENSER WITH TRAP CHAMBER OPERATED BY TILTING THE CONTAINER

Louis Livadas, Springfield, Ohio

Application April 27, 1944, Serial No. 532,945

3 Claims. (Cl. 222—455)

My invention relates to a liquid measuring device. More particularly, it relates to a measuring device which can be suitably attached to a bottle for dispensing predetermined amounts of a liquid.

In the dispensing of liquids, such as liquor, where small quantities are poured into small glasses a great deal of waste occurs in overflowing the glass, which in time amounts to a considerable expense. In the past, measuring devices have been used which have attempted to overcome this difficulty, but they have been unsatisfactory. One of the main disadvantages of prior art measuring devices has been that they are not adjustable so that the amount of liquor can be varied from three quarters of an ounce to one ounce or more. Since various establishments have different size glasses or they may from time to time wish to vary the amounts of liquor poured into their glasses it is obvious that unless the measuring device is adjustable it will be necessary to replace it each time. Another disadvantage of the prior art measuring dispensers is that they are quite generally complicated in structure and have moving parts which become gummed and sticky due to the presence of sugar within the liquid which tends to make them inefficient and even inoperative until they are cleaned. In this latter type of structure I am aware of certain issued patents which have a moving piston within the casing which has to be cleaned frequently to keep it in working condition.

One of the objects of my invention is to provide a liquid measuring device which will greatly reduce the amount of waste in dispensing small quantities of liquid from a bottle.

Another object of my invention is to provide a liquid measuring device which is adjustable so that the amounts of liquid being dispensed can be varied at any time.

Another object of my invention is to provide a liquid measuring device which has no moving parts, other than a ball valve, which will not be subject to clogging or sticking, therefore eliminating frequent cleaning.

Another object of my invention is to provide a liquid measuring device which is of simple construction, light in weight, and inexpensive to manufacture.

Various other objects and advantages will be apparent from the following description and the drawings wherein similar characters of reference designate corresponding parts and wherein.

Figure 1:
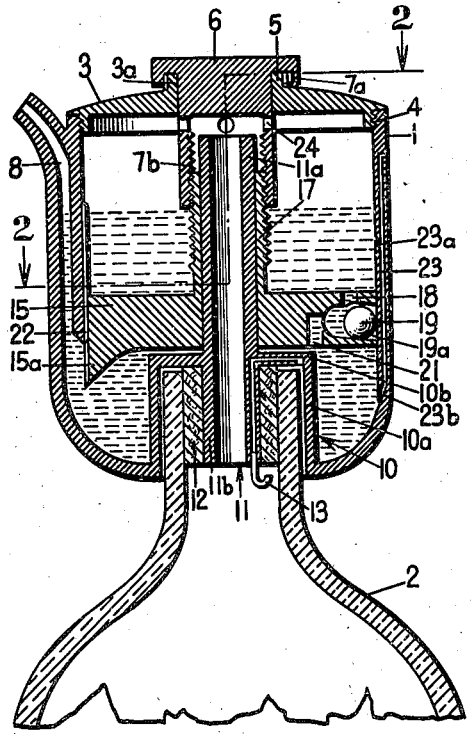
Figure 1 is a side elevational view in section of my liquid measuring device.

Referring to the drawings, particularly to Figure 1, I disclose a measuring device having a casing generally indicated by the numeral 1. This device can be constructed of any suitable material such as a light metal or a plastic. The casing 1 is of such structure and shape that it is adapted to be mounted upon the neck of a container 2 as shown best in Figures 1 and 4.

Figure 2:
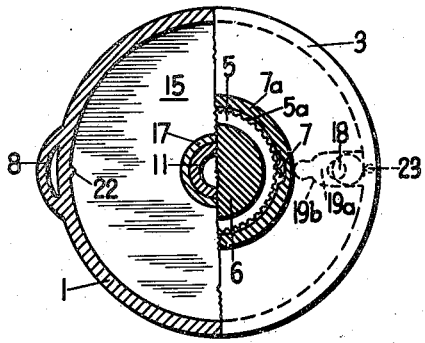
Figure 2 is a sectional view taken along line 2—2 of Figure 1.
Figure 3:
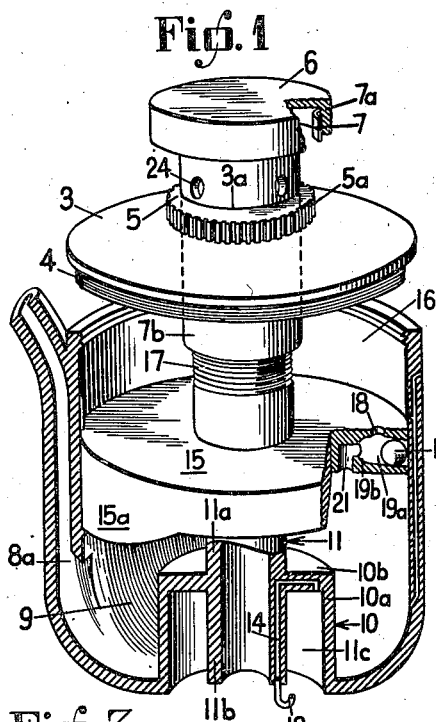
Figure 3 is a perspective view partly broken away with the various parts spaced apart to more clearly illustrate the invention.

The upper end of the casing 1 is closed by means of a cover 3 which is provided with a depending threaded flange 4 for cooperating with the threaded upper end of the casing 1. The cover 3 is further provided with an opening 3a whose periphery is formed with an upwardly extending collar 5 whose outer surface is provided with a knurled portion 5a as best shown in Figures 2 and 3. An adjusting cap 6 is adapted to fit over the knurled collar 5 formed on the cover 3. The cap 6 is provided with a spring 7 carried on the inner surface of a depending peripheral skirt 7a of the cap 6 for engaging the knurling 5a on the collar 5. The cap 6 is provided with a downwardly extending sleeve portion 7b which is internally threaded, and the upper portion is provided with openings 24, for a purpose to be hereinafter described.

Figure 5:
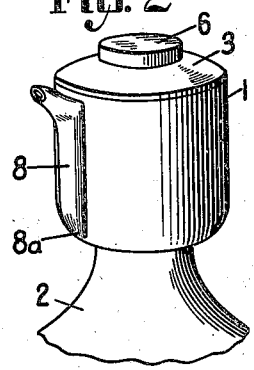
Figure 5 is a perspective view of the liquid measuring device mounted on the top of a bottle.

The casing 1 is further provided with a pouring spout 8 formed integrally therewith as best shown in Figures 2, 3, and 5. The pouring spout 8 is adapted to communicate with the lower portion of the casing 1 as at 8a.

Figure 4:
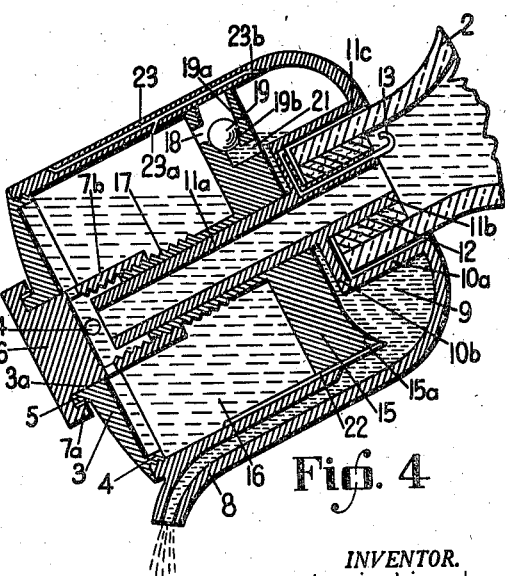
Figure 4 is a side elevational view in section similar to Figure 1 showing the liquid dispensing device in pouring position.

The lower end of the casing 1 is provided with an upstanding circular dome 10 which is adapted to extend within the said casing 1; this dome 10 comprises a side wall 10a and top wall 10b. The dome 10 is provided with a tube 11 that is integrally formed thereon, one portion 11a extending upwardly within the casing 1 and another portion 11b extending downwardly into the hollow portion of the dome, thus forming a recessed portion 11c that is adapted to extend over the neck of the container 2. The tube 11 permits the liquid to enter from the bottle to the casing 1 when the bottle is tilted as shown in Figure 4. A suitable packing material 12, such as cork or the like, surrounds the lower portion 11b so as to make a tight fit between the inside neck portion of the bottle 2 and the tube portion 11b, thus preventing any leakage. Depending from the tube 11b is a vent extension 13 which is adapted to permit replacement of air as the liquid is poured from the bottle. This vent extension 13 communicates with the atmosphere by means of the passageway 14 and the outside neck of the bottle as shown in Figures 1, 3, and 4.

A partition member 15, of disk-like form, is slidably mounted on the tube 11 and adapted to separate the casing 1 into two chambers, such as the lower chamber 9 and the upper chamber 16. This partition 15 can be moved up or down on the tube 11 to any desired location. The disk 15 is provided with an upwardly extending sleeve 17 which is externally threaded and which cooperates with the threaded portion formed on the depending sleeve 7b of the cap 6 which is internally threaded. The threaded portions of the sleeve members 7b and 17 permit adjustment of the partition 15.

The upper surface of disk 15 is flat while the lower surface is provided with a downwardly extended lip portion 15a on one end thereof.

The disk 15 is provided with a ball valve 19 that is located on the opposite side of the lip 15a which purpose will be brought out later.

The ball valve 19 comprises an inclined chamber 19a which is adapted to retain the ball 19, the chamber is further provided with an opening 18 formed in the upper surface of the disk 15 which permits communication with the chamber 16. The chamber 19a is also in communication with chamber 9 by means of an opening 21 formed in the lower surface of the disk 15. The one end of the chamber 19a is provided with a ball seat 19b which is adapted to seat the ball and seal this end of chamber 19a when the bottle is tilted and unseated when upright due to the inclination of the chamber 19a, at which time the ball 19 rests against the casing 1, thus permitting communication between openings 18, 19a, and 21. After a predetermined amount of liquid has filled the lower chamber and the pouring spout 8 the liquid may again be poured out of the spout 8. It will be noted that the lip 15a is at a point where the pouring spout 8 communicates with the lower chamber 9. This is to prevent a pocket forming on the sidewall of the casing above the lower end of the spout in the event the member 15 is raised and the lower chamber is enlarged.

In order to maintain the member 15 against rotation on the tube 11 when adjusting I provide a tongue and groove connection 22 as best shown in Figures 1, 2, and 4. This tongue and groove 22 is adapted to prevent rotation of the disk 15 when the adjusting cap 6 is turned. Thus the disk 15 will move upwardly or downwardly instead of rotating on the tube 11 within the casing 1. It is also adapted to keep the openings 18 and 21 and the ball valve structure 19 at the adjacent side of the pouring spout 8. It will further be noted that I provide a vent 23 in the sidewall of the casing 1 which is adapted to form a communication between chamber 9 and chamber 16 through the openings 23a and 23b. Since the passageway 23 is of a very small size there is no danger of the liquid's evaporating or dropping therefrom.

Referring more particularly to Figure 4 I provide openings 24 in the depending sleeve member 7b. These openings 24 permit the liquid to flow from the bottle 2 through the tube 11 and into the upper chamber 16 when the bottle is tilted as shown in Figure 4.

Having thus described the structure of my invention I will now describe the operation of the same. The lower end of the dispensing device is placed on the neck of a bottle and said neck also extends within the dome 10 formed within chamber 9, thus being sealed against leakage by the cork packing member 12. The adjusting cap 6 may then be turned, thus rotating the sleeve 7b which is in threaded cooperation with the threaded sleeve 17 carried by disk 15. Since the disk 15 cannot rotate on the tube 11 due to the tongue and groove connection it will move up or down on the tube 11 depending on rotation of the cap 6. After the proper adjustment has been made the device is then filled by tilting the bottle 2 on which it is mounted. The upper chamber 16 is filled with liquid through the tube 11 and the openings 24 in the sleeve 7b. Since the upper chamber 16 is preferably larger than the lower chamber 9, the amount will be sufficient to fill chamber 9 when the bottle 2 is returned to its normal position. The ball valve 19 will permit the liquid to escape from the upper chamber 16 into the lower chamber 9 until the said chamber is filled. Upon the next tilting of the bottle a predetermined amount of liquid will be dispensed from the lower chamber due to the fact that the ball valve 19 seats, thereby sealing the opening 21 which prevents any liquid from escaping into the upper chamber 16. As the liquid is poured from chamber 9 the upper chamber 16 will be filling in the manner previously described. Thus, each time the bottle is tilted the lower chamber will empty an exact amount of liquid and the upper chamber will fill and subsequently discharge part of the liquid into the lower chamber when the bottle is again placed in its normal position.

It will be obvious from the above description that I provide a liquid measuring device having many advantages. One of the advantages of my device is that it eliminates unnecessary moving parts which are likely to become sticky, thus making the device inoperative, and a further advantage of the adjustable means is that it is simple in construction. Another advantage of my invention is that it is adapted to dispense small quantities of liquids in predetermined amounts and also prevents any waste by overflowing. Many other advantages will be apparent from the above description, the drawings, and the following claims.

Having thus described my invention, what I claim is:

1. A liquid dispensing device of the type described comprising a casing having sidewalls of substantially cylindrical form, a closure member disposed in the upper end of said casing, a recess formed in the lower end of said casing which is adapted to fit over the neck of a bottle, a tubular inlet member disposed centrally inside of said casing, a partition for separating the inside of the casing into two chambers, said partition being mounted on said tubular inlet member and adapted to be adjusted to vary the size of said chambers, said partition having an opening formed therein for permitting communication between said chambers, a ball valve adapted to close said opening at various times, and a pouring spout formed in the sidewall of the casing and having its lower end connected to the lowermost chamber.

2. A liquid dispensing device of the type described comprising a casing having sidewalls of substantially cylindrical form, a cap member for closing the upper end of said casing, the lower end of said casing having a recess formed therein which is adapted to fit around the upper end of a liquid container, a pouring spout formed in one of the sidewalls of said casing, a tubular inlet member disposed centrally inside of said casing, the lower end of said tubular member extending through said recess formed in the casing, a transverse disk disposed on said tubular member, said disk having an upwardly extending threaded sleeve, said cap member having a downwardly extending sleeve having threads disposed on the interior thereof for cooperating with the threads on the upwardly extending sleeve of the said disk whereby said disk is moved upwardly or downwardly by rotating the cap member, said disk forming upper and lower chambers, said disk having an opening formed therein for permitting communication between said chambers, a ball valve disposed in said disk for closing said opening at various times, and said lower chamber being of predetermined capacity depending upon the adjustment made by the rotation of said cap member.

3. A structure according to claim 2 wherein the transverse separating disk has a substantially flat upper surface and has a depending lip portion formed on its lower surface located adjacent the pouring spout so as to prevent any liquid remaining in the lower chamber during the pouring operation.

LOUIS LIVADAS.

REFERENCES CITED

The following references are of record in the file of this patent:

UNITED STATES PATENTS

| Number | Name | Date |
| --- | --- | --- |
| 1,066,127 | Lewis | July 1, 1913 |